Nov. 26, 1968  J. A. SMITH  3,413,004
GAME APPARATUS COMPRISING CARDS HAVING COLUMNS OF LETTERS
THEREON AND MARKERS FOR PLACEMENT ON SAID LETTERS
Filed Feb. 3, 1966  2 Sheets-Sheet 1

INVENTOR
JAMES A. SMITH

BY *B.P. Fishleun, Jr.*

ATTORNEY

Nov. 26, 1968  J. A. SMITH  3,413,004
GAME APPARATUS COMPRISING CARDS HAVING COLUMNS OF LETTERS
THEREON AND MARKERS FOR PLACEMENT ON SAID LETTERS
Filed Feb. 3, 1966  2 Sheets-Sheet 2
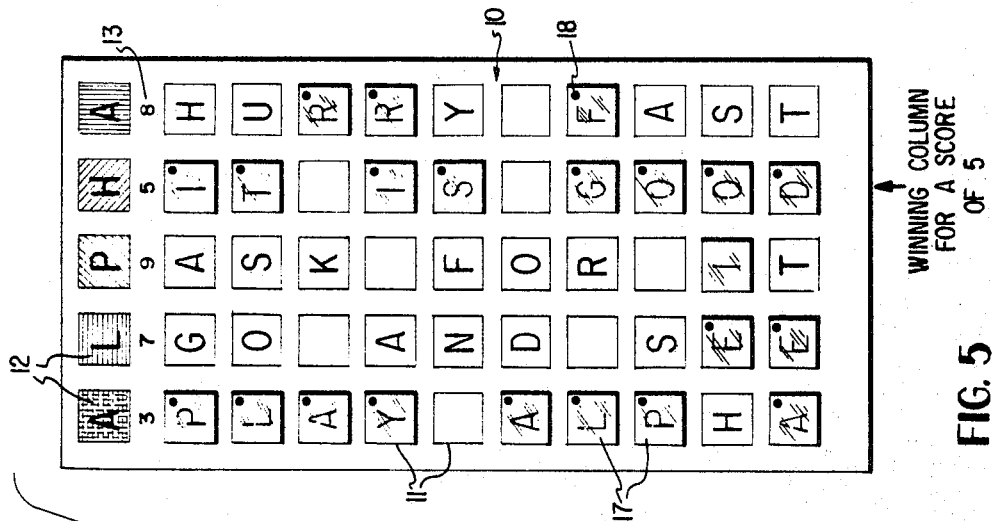
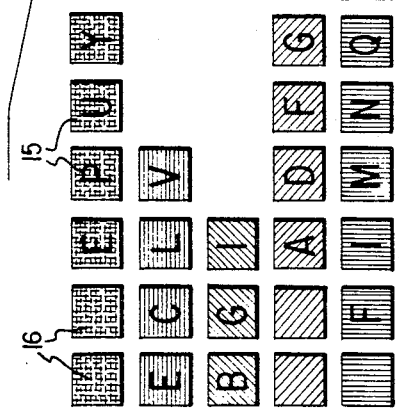
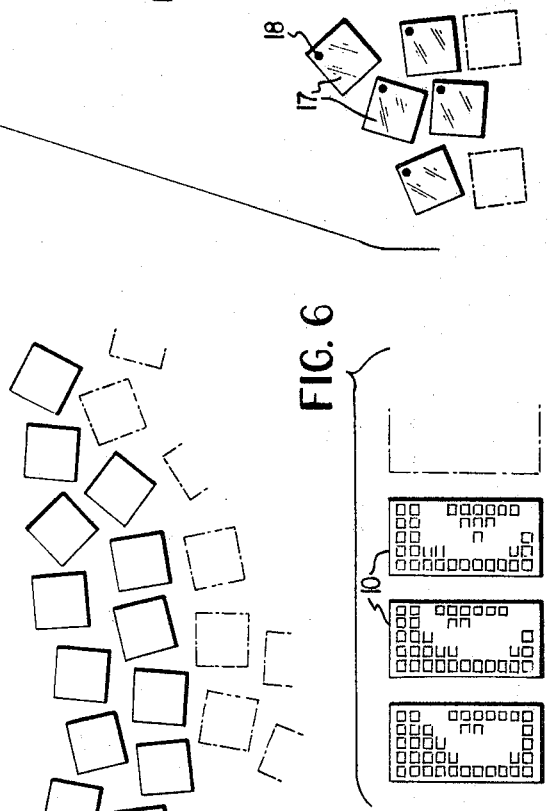
INVENTOR
JAMES A. SMITH
BY
ATTORNEY 3,413,004
GAME APPARATUS COMPRISING CARDS HAV-
ING COLUMNS OF LETTERS THEREON AND
MARKERS FOR PLACEMENT ON SAID LETTERS
James A. Smith, Casablanca, Morocco
(500 N. Wilson St., Metairie, La. 70003)
Filed Feb. 3, 1966, Ser. No. 524,913
2 Claims. (Cl. 273—135)

ABSTRACT OF THE DISCLOSURE

A plurality of game cards each has plural rows of playing spaces and certain groups of the spaces in the rows are lettered while the remaining spaces are unlettered. Letters may repeatedly occur in some rows. The lettered spaces in each row have a color designation for that row. Game tiles are provided in groups each of which comprises a complete alphabet of lettered tiles and a plurality of unlettered tiles, all tiles in a group being of the same color, each group color corresponding to a different one of said designated row colors, and multiple transparent player tiles are provided to be placed over lettered spaces in the rows on said cards in response to selection and calling of the lettered and colored tiles, each transparent tile having thereon an opaque marking spaced a substantial distance from the center of the tile.

---

The objective of the invention is to provide a game which is amusing, interesting and instructive and which is particularly well adapted for children but also may be utilized by adults. The game has been conceived to capture and retain the attention of all of the players throughout the game and to foster a competitive spirt of play.

A more specific objective of the invention is to provide a game which will aid children in learning spelling and reading and in differentiating between the various parts of speech.

Another object of the invention is to provide a table-type game involving cards upon which various words are printed, and according to the game rules, the players place transparent tiles upon lettered portions of the game cards until at least one row of letters spelling certain words is covered with tiles, during all of which action the letters and words remain fully visible to the players for educational purposes.

Secondary objects of the invention include the teaching of children color differentiation, numerical values and simple addition.

Still another object is to provide a game whose apparatus components are simplified, economical to manufacture, and attractive in appearance.

Other objects and advantages of the invention will become apparent during the course of the following detailed description.

In the accompanying drawings forming a part of this application and in which like numerals are employed to designate like parts throughout the same, FIGURE 1 is a plan view of a typical game card employed by a player of the game;

FIGURE 4 is a plan view showing a mass of the colored and lettered or unlettered tiles arranged face downwardly and others arranged face upwardly in color sequence as they are taken out of play by the game caller;

FIGURE 5 is a plan view of a game card and group of transparent tiles illustrating a winning game play; and FIGURE 6 is a diagrammatic plan view, on a greatly reduced scale, showing a plurality of the game cards.

Figure 2:
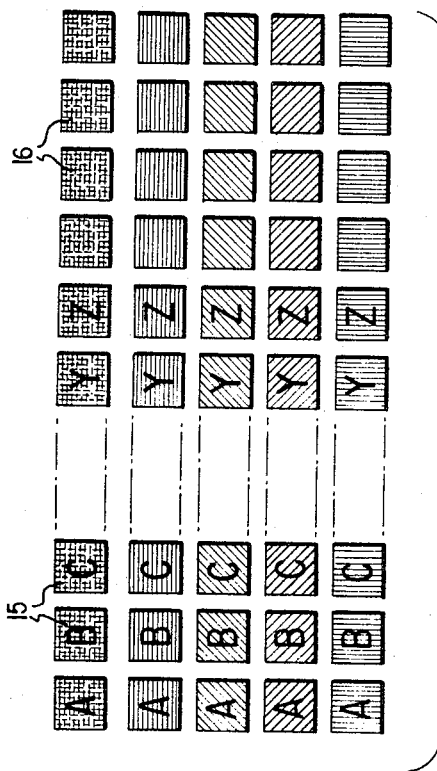
FIGURE 2 is a composite plan view of alphabetical groups or sets of lettered tiles and unlettered tiles in the several colors employed in the game.
Figure 3:
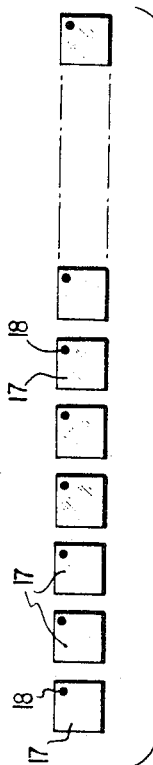
FIGURE 3 is a plan view showing a plurality of substantially transparent tiles utilized in the game.
Figure 1:
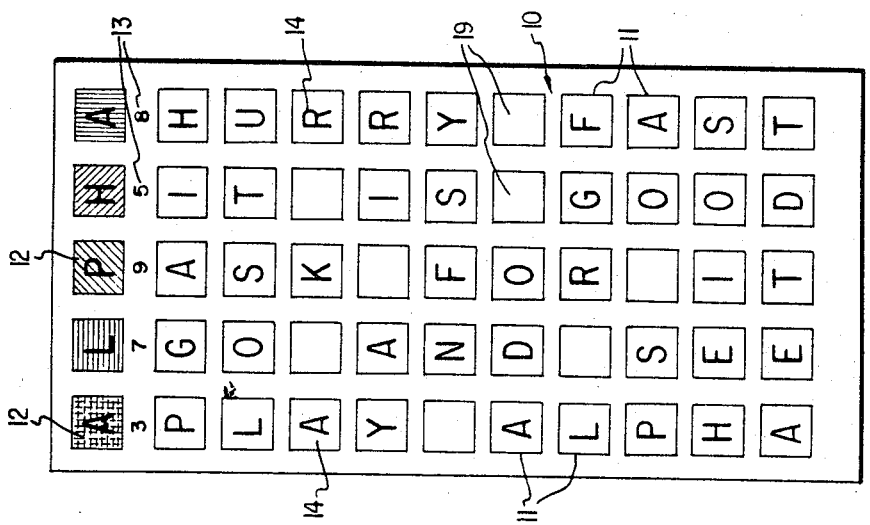

In the drawings wherein for the purpose of illustration is shown a preferred embodiment of the invention, attention is directed first to FIGURES 1 through 3 showing the game apparatus components, as distinguished from FIGURES 4 and 5 which illustrate the playing of the game.

In FIGURE 1, a typical rectangular game card 10 is shown, formed of any preferred material and having visibly marked thereon a multiplicity of preferably square spaces 11 arranged in preferably five vertical rows on the game card. The number of rows and the number of spaces in the rows may be varied in the manufacturing of the game, as found desirable. In the embodiment shown, each row of spaces 11 is topped by a distinctly colored space 12 so that each row on the card has a definite color designation, such as yellow, blue, brown, green and red, reading from left-to-right in FIGURE 1, as shown. The letters which spell out the chosen name for the game such as "ALPHA" preferably appear on the color spaces 12. These letters have no significance in the playing of the game. If preferred, the spaces 12 may be unlettered and the name of the game can appear elsewhere. Preferably beneath the color spaces 12 in each row or column, the scoring numerals 13 which indicate the value of the score for a completed game play in the particular row are printed.

In various spaces 11 of the several vertical rows of spaces, letters 14 are printed, preferably although not necessarily in the color of the above space 12, the letters being arranged in the rows to spell out various words which are read downwardly in the rows. Preferably, each row contains at least two words and a simple sentence may or may not be constructed in a given row. In this manner, each game card 10 may exhibit a variety of different words in any chosen language and, to add to the interest and educational qualities of the game, some game cards may display nouns while others display verbs or other preferred parts of speech. A variety of interesting word combinations can be devised on the various game cards. For example, in each vertical row, there may be a pair of words, one of which has a relation to the other, such as JOKE-FUNNY; SWIM-WATER; BOOK-LEARN; ZERO-ROUND and the like. Any number of the cards 10 may be provided in a complete game set and an average game apparatus will contain about ten cards. A single player may utilize one card, or two or more cards simultaneously.

In FIGURE 2, there are shown the sets or groups of lettered or unlettered and colored tiles utilized by the "caller" in the playing of the game. As shown, five groups of tiles are provided with each group having a colored face corresponding to one of the five colors employed on the game cards 10. Each colored group of tiles shown in FIGURE 2 contains twenty-six lettered tiles 15 or a complete alphabet of lettered tiles, in each given color, from A to Z. Each colored group also contains four unlettered tiles 16 in the same color and these are "wild" tiles which have a special significance in the playing of the game. These tiles are sometimes referred to as "line letter" tiles. Therefore, each complete color group of opaque game tiles numbers 30, making a grand total of 150 opaque color tiles, both lettered and unlettered, in the game apparatus. The reverse faces of the tiles 15 and 16 may be neutrally colored or shaded in a common tone so as to look alike when the tiles are placed face downwardly, as shown at the bottom portion of FIGURE 4.

As shown in FIGURE 3, the game apparatus further comprises a suitably large number of preferably transparent, unlettered and uncolored tiles 17 which are utilized by the individual game players. The tiles may be made out of plastic, glass or any other suitable material. Each transparent tile 17 has an etched opaque marking or spot 18, preferably near one corner thereof, and on one major surface only of the tile, for a purpose to be described in the actual playing of the game.

Reference is now made to FIGURES 4 and 5 which depict the manner in which the game apparatus is used.

Initially, all of the cards 10 may be turned face down and each of the two or more players is allowed to select one or more cards according to the supply of cards. All cards selected by a player are played simultaneously for one complete game. An individual game is over when a player completes the filling in of one of the vertical rows of spaces on a card, as will be further described.

All of the tiles 15 and 16 are turned face down, as indicated at the bottom portion of FIGURE 4, and a player or score-keeper or "caller" turns up the colored tiles one at a time and reads the letter, if any, and the color so that the players may hear and take note. Each player attentively looks at his card 10 and if a particular player or players have a matching letter and color on his or their cards, one of the transparent tiles 17 is placed on the matching space on the card 10, with the etched or engraved spot 18 uppermost. For a given reading by the "caller," all matching letters on the card 10 of a given player may be covered by transparent tiles. That is to say, if the "caller" turns up and reads out a YELLOW L and, as shown in FIGURE 5, a given player's card contains two L's in the YELLOW row, both of these may be covered on the one play.

In order to speed the play and to increase game interest and variety of play, the unlettered colored tiles 16 are utilized in the following manner. When one of the tiles 16 is turned up for play by the "caller," all players may cover any one letter or two or more matching letters of the color of the tile 16 on their cards. That is, if a GREEN tile 16 is turned up and a particular player has three A's in the GREEN row on his card, the player may cover all three of these A's with transparent tiles 17. However, in this instance, when the transparent tile is used to cover the letter or letters in a particular color corresponding to the tile 16, the engraved spot 18 on the transparent tile is arranged downwardly instead of upwardly. This is done to distinguish the play between the normal lettered tiles 15 and the unlettered tiles 16 of like color.

All transparent tiles 17 which are played on a particular card in response to the calling of unlettered colored tiles 16 may be replayed as the game progresses. For example, if a player has covered three A's in a GREEN row as a result of the calling of a GREEN tile 16, and later on in the game, a GREEN tile 15 with the letter A is called, the player may cover the same three A's with transparent tiles 17 having their spots 18 turned upwardly and may utilize the previously played transparent tiles to the best possible advantage on the card, keeping the spots 18 turned downwardly, because these tiles are still being played on the basis of calling an unlettered tile 16. Even if the player can replay to his advantage only one of the three tiles 17 originally played on the call of a tile 16, he has gained one letter on his card. Quite possibly, in some instances, he could play two or more matching letters, thereby making a considerable advance. It should be understood that this play is limited to a single vertical row on the card as identified by the color of the unlettered tile 16 originally called.

As the tiles 15 and 16 are called and taken out of play, they are placed aside in color sequence, as shown at the top of FIGURE 4, to facilitate the verification of completed rows on the cards.

The first player to complete a vertical row on the card 10 announces this fact and that individual game is over. The winning player's score is then marked according to the scoring numeral 13 of the completed row. If a player is playing more than one card and completes the covering with transparent tiles of more than one row at the same time, his score is the total of the numerals 13 for all completed rows. If more than one player announces a completed row at the same time, each such player is scored individually according to the particular numeral 13 for that row on his or her card. Following this, the cards are cleared of transparent tiles 17 and turned face down and mixed. All colored tiles 15 and 16 are then turned face down and mixed. The players select one or more cards and a new game begins.

A complete game is over when a player has scored a total of twenty-five points made up from the scoring numerals 13, if playing with one card. For each additional card used by the player, twenty-five points is added to the required number of winning points. That is, if all players are playing with two cards, then fifty points is necessary to win, three cards seventy-five points, etc. If more than one player makes a winning score simultaneously, the player having the greater amount of points is the winner.

The rules of the game may be varied somewhat within the spirit and scope of the invention.

It is desired to point out, in connection with the scoring system, that the same is not merely chosen at random or without mathematical reasoning. Scoring is calculated on a handicap system wherein points are deducted from a base figure of ten. This is the highest possible individual row score. Scoring is calculated as follows: one point is deducted from a vertical row on a card for each matching letter in the row. If there are two E's in a row, two points are deducted, etc. An additional one point is deducted from a row for each blank or unlettered space 19, FIGURE 1, between words in excess of one in that individual row. For example, in the illustration of FIGURE 5, first row beneath the YELLOW space 12, the scoring value for this row is three. From the base FIGURE 10 seven has been deducted because of three matching A's, two matching L's and two matching P's. In the next row the scoring value is seven. One has been deducted because of two blank spaces and two more points have been deducted because of two matching letters E. In the next row, there are no matching letters and only one point is deducted from ten because of two blank spaces, making a scoring value of nine for this row.

FIGURE 5 simply shows the same card 10 illustrated in FIGURE 1 after the playing of an individual game leading to the completion of a winning row under the GREEN H having a score value of five. The words IT IS GOOD, forming a simple sentence, have been completely covered with transparent tiles, as indicated. FIGURE 5 shows additional rows wherein the lettered areas are incompletely covered with transparent tiles. Obviously, FIGURE 5 is merely illustrative of many possible winning scores on the numerous cards 10 which vary as to their printed word format.

FIGURE 5 also illustrates an important feature of the game previously mentioned which should be emphasized, namely, that all of the lettered spaces on the card 10 at all stages of the game are visible to the player through the transparent tiles 17. This enables young readers to read and study the words and letters while playing the game. The advantages of the arrangement should now be readily apparent without the necessity for any further description herein.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A game apparatus comprising a plurality of printed game cards each having vertical rows of playing spaces, predetermined groups of the space in said rows being lettered and the remainder of the spaces being unlettered, the lettered spaces in each row having a color designation for that row, a multiplicity of game tiles including groups which are alphabetically lettered and colored with a complete alphabet in each group, the color of each group corresponding to a different one of the colors of said rows on said cards, said groups of tiles also including unlettered tiles of the same color as the lettered tiles, and a multiplicity of substantially transparent player tiles to be placed over the lettered spaces of the rows on said cards responsive to the calling out of the colored lettered and unlettered game tiles, said substantially transparent tiles each having a substantially opaque marking thereon on one major face thereof only and said marking being positioned a substantial distance from the center of the transparent tile face.

2. A game apparatus as defined by claim 1, wherein certain letters occur repeatedly in at least some of the vertical row on said cards, and wherein each card bears printed score value numerals thereon for the several rows of playing spaces on the card and said numerals varying in value in relation to the frequency of occurrence of repetition of letters in said rows.

References Cited

UNITED STATES PATENTS

| | | | |
|---|---|---|---|
| 88,421 | 3/1869 | Slagle | 273—135 |
| 129,983 | 7/1872 | Patterson | 273—135 |
| 1,655,380 | 1/1928 | Parker | 273—135 |
| 2,095,111 | 10/1937 | Triolo. | |
| 2,322,324 | 6/1943 | Spitzner | 273—135 |
| 2,470,310 | 5/1949 | Heyman | 273—135 |
| 3,116,927 | 1/1964 | Kuhlman | 273—135 |

FOREIGN PATENTS

| | | |
|---|---|---|
| 491,948 | 4/1953 | Canada. |

DELBERT B. LOWE, *Primary Examiner.*